United States Patent
Lange et al.

(10) Patent No.: US 10,454,510 B2
(45) Date of Patent: Oct. 22, 2019

(54) CREST FACTOR OPTIMIZATION IN A DIGITAL REPEATER SYSTEM

(71) Applicant: Andrew Wireless Systems GmbH, Buchdorf (DE)

(72) Inventors: Keld Knut Lange, Oetisheim (DE); Thomas Kummetz, Kissing (DE)

(73) Assignee: Andrew Wireless Systems GmbH, Buchdorf (DE)

( * ) Notice: Subject to any disclaimer, the term of this patent is extended or adjusted under 35 U.S.C. 154(b) by 21 days.

(21) Appl. No.: 15/573,433

(22) PCT Filed: May 11, 2016

(86) PCT No.: PCT/EP2016/060610
§ 371 (c)(1),
(2) Date: Nov. 10, 2017

(87) PCT Pub. No.: WO2016/180905
PCT Pub. Date: Nov. 17, 2016

(65) Prior Publication Data
US 2018/0115331 A1 Apr. 26, 2018

Related U.S. Application Data

(60) Provisional application No. 62/159,486, filed on May 11, 2015.

(51) Int. Cl.
| | |
|---|---|
| *H04L 25/49* | (2006.01) |
| *H04B 1/04* | (2006.01) |
| *H04L 27/26* | (2006.01) |

(52) U.S. Cl.
CPC ....... *H04B 1/0475* (2013.01); *H04L 27/2621* (2013.01); *H04L 27/2623* (2013.01); *H04B 2001/0408* (2013.01)

(58) Field of Classification Search
CPC ........ H03F 1/3247; H03F 27/368; H03F 3/24; H03F 3/68; H04B 1/0475; H04B 10/5161;
(Continued)

(56) References Cited

U.S. PATENT DOCUMENTS

2007/0254592 A1 11/2007 McCallister et al.
2010/0150256 A1 6/2010 Morris et al.
(Continued)

FOREIGN PATENT DOCUMENTS

| EP | 1811732 A2 | 7/2007 |
| WO | 2013123651 A1 | 8/2013 |

OTHER PUBLICATIONS

International Searching Authority, "International Search Report and Written Opinion for PCT Application No. PCT/EP2016/060610", "Foreign Counterpart to U.S. Appl. No. 15/573,433", dated Nov. 4, 2016, pp. 1-19, Published in: US.
(Continued)

*Primary Examiner* — Khai Tran
(74) *Attorney, Agent, or Firm* — Fogg & Powers LLC

(57) ABSTRACT

An optimization system for use in a digital repeater system comprises at least one input port for receiving a carrier signal associated with a communication channel of a telecommunication network, at least one meter unit for obtaining an estimate of the error vector magnitude for the carrier signal, and at least one crest factor reduction unit for dynamically reducing, based on the estimate of the error vector magnitude, the crest factor of the carrier signal.

16 Claims, 5 Drawing Sheets

(58) Field of Classification Search
CPC .............. H04B 7/0413; H04L 27/2623; H04L 27/2614; H04L 2015/0342
USPC .................................. 375/296; 341/155, 156
See application file for complete search history.

(56) References Cited

U.S. PATENT DOCUMENTS

| | | | |
|---|---|---|---|
| 2010/0208853 A1* | 8/2010 | Qian ..................... | H04L 27/233 375/346 |
| 2014/0119281 A1* | 5/2014 | Kummetz ................. | H04L 1/00 370/328 |
| 2015/0022269 A1* | 1/2015 | Huang ................ | H04L 27/2623 330/291 |
| 2016/0182136 A1* | 6/2016 | Zhang .................. | H04B 7/0465 370/329 |
| 2016/0373072 A1* | 12/2016 | Magesacher ......... | H04B 1/0475 |

OTHER PUBLICATIONS

European Patent Office, "Communication pursuant to Article 94(3) from EP Application No. 16723078.8 dated Dec. 20, 2018", from Foreign Counterpart to PCT Application No. PCT/EP2016/060610, dated Dec. 20, 2018, pp. 1-11, Published: EP.
Wood, "Behavioral Modeling and Linearization", 2014, pp. 1-3, Artech House.

* cited by examiner

Input stage

First CFR stage

CREST FACTOR OPTIMIZATION IN A DIGITAL REPEATER SYSTEM

CROSS-REFERENCE TO RELATED APPLICATIONS

This application is a U.S. National Stage application of PCT Application Serial No. PCT/EP2016/060610, filed 11, May 2016 and titled "CREST FACTOR OPTIMIZATION IN A DIGITAL REPEATER SYSTEM," which claims the benefit of U.S. Provisional Application Ser. No. 62/159,486, filed 11, May 2015 and titled "OPTIMIZATION SYSTEM FOR USE IN A DIGITAL REPEATER SYSTEM," the contents of all of which are incorporated herein by reference.

TECHNICAL FIELD

The invention generally relates to the field of telecommunications, in particular to repeater systems for receiving and retransmitting carrier signals associated with communication channels of one or multiple telecommunications networks. Specifically, the invention relates to an optimization system for use in a digital repeater system, and to a method for optimizing the operation of a digital repeater system.

BACKGROUND

Nowadays, repeater systems are constituted to serve a wide frequency band, for example a complete 3GPP band. Herein, a frequency band typically contains multiple carriers carrying information according to different communication technologies and standards such as GSM, UMTS, LTE or the like.

The power efficiency of a (high-power) repeater system depends on the efficiency of a power amplifier, making use for example of a transistor. A power amplifier in this context generally is used in the linear regime in which the output power linearly relates to the input power. The closer the power amplifier is operated to its saturation point, the more non-linear distortions will occur in the amplified signal, leading to unwanted intermodulation products. A power amplifier hence generally is operated with a significant backoff from its saturation point, meaning that the power amplifier's maximum output power level is reduced in a way such that the entire signal lies within the linear region of the power amplifier's transfer curve. Because the backoff reduces the efficiency of the power amplifier (namely the power amplifier's ability to convert the DC supply power into RF energy), it however is desired to keep the backoff as small as possible.

The backoff generally should be chosen according to the peak-to-average ratio (PAR) of the signal to be amplified. If signal peaks exceed the saturation point of the amplifier, this may lead to a clipping of the peaks, causing intermodulation products and adding to the noise, resulting in an increased error rate for a radio transmission.

Generally, the quality of a broadband RF signals quantified by the so-called error vector magnitude value (in short: EVM). The error vector magnitude represents a measure for the deviation of a symbol from its ideal constellation point. The error vector magnitude serves as a characteristic value for the signal amplification and the noise of a receiver and may be indicated in dB or percent.

For different radio access technologies, different permissible limits for the error vector magnitude exist. For example, in UMTS (using a 16-QAM constellation) an error vector magnitude limit of 12.5% must not be exceeded. UMTS signals hence must have an EVM smaller than 12.5%. In another example, in LTE (using a 64-QAM constellation) an error vector magnitude limit of 8% exists.

An input signal generated for example by a base station and received at a receiver in the downlink direction (towards a user equipment) in general will comprise a non-zero error vector magnitude. When passing the repeater system, the repeater system will additionally contribute to the error vector magnitude of the signal. If a signal comprises for example an error vector magnitude of 8% at the input of the repeater system and if the repeater system adds another 8% to the error vector magnitude, the resulting error vector magnitude will be about 11.3%, assuming that the error vector magnitude contributions are uncorrelated. This would result in an unacceptable EVM for a 64-QAM transmission (for example in LTE), while the permissible limit for 16-QAM transmissions (in UMTS) would not be reached.

SUMMARY OF THE INVENTION

Certain examples of the invention can optimize a peak-to-average ratio of a signal such that a power amplifier can be operated with a reduced backoff.

Certain examples of the invention can optimize the peak-to-average ratio of the signal in a way that a permissible error vector magnitude limit is not exceeded.

According to one aspect, an optimization system for use in a digital repeater system comprises at least one input port for receiving a carrier signal associated with a communication channel of a telecommunication network, at least one meter unit for obtaining an estimate of the error vector magnitude for the carrier signal, and at least one crest factor reduction unit for dynamically reducing, based on the estimate of the error vector magnitude, the crest factor of the carrier signal.

In another aspect, an optimization system for use in a digital repeater system comprises an input stage including a multiplicity of input ports for receiving a multiplicity of carrier signals associated with a multiplicity of communication channels of one or multiple telecommunication networks, and a first stage including a multiplicity of meter units for obtaining an estimate of the error vector magnitude for each carrier signal and a multiplicity of first stage crest factor reduction units for dynamically reducing, based on the estimate of the error vector magnitude, the crest factor of each carrier signal.

In yet another aspect, the optimization system further comprises a second stage including a combiner for combining output signals of the multiplicity of first stage crest factor reduction units to obtain a second stage combined signal, and a second stage crest factor reduction unit for dynamically reducing the crest factor of the combined signal.

In yet another aspect, a method for optimizing the operation of a digital repeater system comprises the steps of: receiving a carrier signal associated with a communication channel of a telecommunication network, obtaining an estimate of the error vector magnitude for the carrier signal, and dynamically reducing, based on the estimate of the error vector magnitude, the crest factor of the carrier signal.

BRIEF DESCRIPTION OF THE DRAWINGS

The various features and advantages of certain examples of the present invention may be more readily understood with reference to the following detailed description and the embodiments shown in the drawings. Herein.

DETAILED DESCRIPTION

Figure 1:
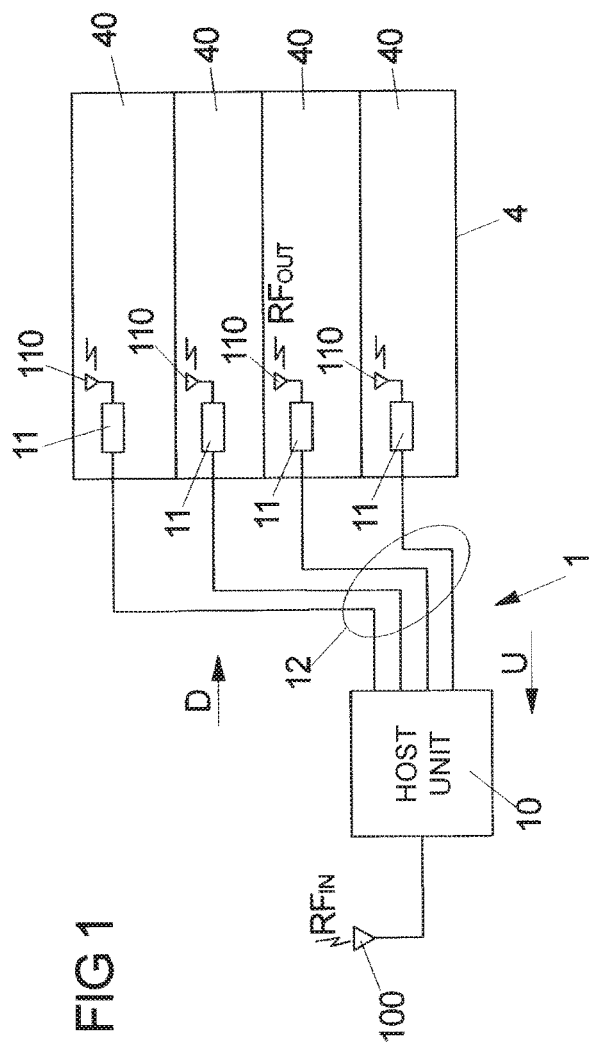
FIG. 1 shows a schematic overview of a digital repeater system comprising a host unit connected to multiple remote units.

Subsequently, certain embodiments of the invention are described in detail with reference to the drawings. In the drawings, like reference numerals designate like structural elements.

It is to be noted that the embodiments are not limiting for the invention, but merely represent illustrative examples.

FIG. 1 shows, in a schematic drawing, an embodiment of a digital repeater system 1 comprising a host unit 10 and multiple remote units 11. The host unit 10 may for example be located outside a building 4 and comprises an antenna 100 via which the host unit 10 is for example connected to one or multiple base stations of one or multiple communication networks using, for example, an air interface. The remote units 11 are located on different floors 40 of the building 4 and serve to provide coverage throughout the different floors 40 of the building 4. The remote units 11 are connected to the host unit 10 via a transport medium 12, for example a network of optical fibers, and hence are in communication connection with the host unit 10. Each remote unit 11 comprises an antenna 110 via which the remote unit 11 for example is connected to a mobile device of a user on a floor 40 of the building 4.

In a downlink direction D, an RF input signal $RF_{IN}$ is received via the antenna 100 at the host unit 10, is processed within the host unit 10 for transporting it via the transport medium 12 to the different remote units 11 and, after further processing, is send out via the antennas 110 as an RF output signal $RF_{OUT}$. The RF output signal $RF_{OUT}$ may be received by a mobile device in the building 4.

The host unit 10 in the shown embodiment is connected with one or multiple base stations of one or multiple operators of one or multiple communication networks via an air interface. It however is also possible that the host unit 10 is connected to the base stations in a wire-bound fashion, the base stations feeding for example digital data into the host unit 10 and receiving data from the host unit 10 via a data link such as a coaxial cable connection or the like.

Vice versa, in an uplink direction an RF signal received at the antenna 110 of a remote unit 11 is fed via the transport medium 12 to the host unit 10 and is retransmitted via the antenna 100 towards an outside communication network (or is directly fed into one or multiple base stations of one or multiple telecommunication networks via a wired communication link).

Figure 2:
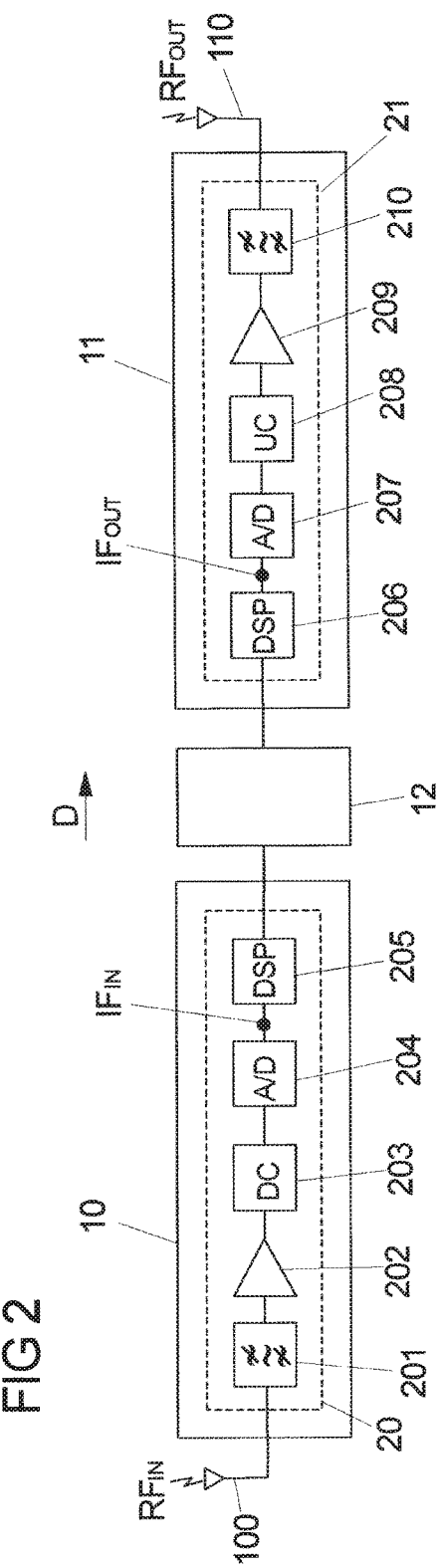
FIG. 2 shows a schematic drawing showing functional processing blocks in the host unit and a remote unit for digital processing of an RF signal in a downlink direction.

The digital repeater system 1 performs a digital processing of the RF signal, as functionally shown in FIG. 2. FIG. 2 herein depicts such functional entities of the host unit 10 and a remote unit 11 connected via the transport medium 12 to the host unit 10 which are used in the downlink direction D for processing the RF input signal $RF_{IN}$ for retransmission.

In the embodiment of FIG. 2, the host unit 10 comprises a receiving section 20 for processing an RF input signal $RF_{IN}$ received by the antenna 100. In particular, the receiving section 20 comprises an RF filter 201 in the shape of a bandpass filter for filtering out a frequency band to be processed and transported for retransmission. From the RF filter 201 the RF input signal $RF_{IN}$ is fed to a low noise amplifier 202 and to a downconverter 203 for downconverting the RF signal into an intermediate frequency band. After that, the signal is fed to an analog-to-digital converter 204 for digitizing the RF signal, such that an (intermediate-frequency) digital signal $IF_{IN}$ is obtained.

The digital signal $IF_{IN}$ is fed to a digital signal processing unit (in the shape of a DSP, an FPGA or the like) 205 and is digitally processed in the digital signal processor 205. The digital signal processor 205 may in particular channelize the digital signal $IF_{IN}$ to process carrier signals of communication channels contained in the digital signal $IF_{IN}$ separately, in particular to filter and optimize the carrier signals as shall be described in more detail below.

After digital signal processing, the processed signal is, via the transport medium 12, transported to a digital signal processor 206 of a transmitting section 21 of a remote unit 11, in which the signal is further processed such that a digital signal $IF_{OUT}$ in the intermediate frequency range is obtained. This digital signal $IF_{OUT}$ is converted to an analog RF signal by means of a digital-to-analog converter 207, is upconverted by an upconverter 208, is power-amplified by a power amplifier 209, is filtered by an RF filter 210 in the shape of a bandpass filter and is transmitted as an RF output signal $RF_{OUT}$ via the antenna 110 of the remote unit 11.

In the uplink direction U, essentially the same takes place, wherein in that case an RF input signal is received and processed by an receiving section 20 of a remote unit 11 and is further processed and transmitted via a transmitting section 21 of the host unit 10.

In the example shown in FIG. 2, the transmitting section 21 comprises a power amplifier 209 for power amplification of an RF signal for transmission. A transmitting section 21 of this kind is placed in each remote unit 112 to retransmit output RF signals $RF_{OUT}$ into different coverage areas or floors 40 associated with the remote units 11 in the downlink direction D. A transmitting section 21 of a similar kind is also located in the host unit 10 in order to power amplify and transmit RF signals from the host unit 10 towards one or multiple base stations of one or multiple outside telecommunication networks.

The power amplifier 209 generally is to be operated in the linear regime in order to avoid non-linear distortions of the RF signals (wherein it also is possible to push the amplifier into saturation by applying a suitable digital pre-distortion technique). For this, the power amplifier 209 is operated with a backoff from its saturation point, wherein the backoff generally must be chosen according to the peak-to-average ratio (PAR) of the RF signals to be amplified. If the RF signal exhibits a large peak-to-average ratio, the backoff of the power amplifier 209 must be large, leading to a decrease of the efficiency of the power amplifier 209.

Hence, by reducing the peak-to-average ratio of the RF signal the efficiency of the power amplifier 209 may be optimized in that the power amplifier 209 can be operated with a smaller backoff.

The peak-to-average ratio of a signal may for example be reduced by identifying a peak within the signal and by adding an inverse peaking signal to the signal which cancels out the peak. By this, the peak-to-average ratio is reduced, but noise is added to the signal, resulting in an increased error rate for the radio transmission.

Hence, an optimization system for use in a digital repeater system is provided, which, in one aspect, comprises at least one input port for receiving a carrier signal associated with a communication channel of a telecommunication network, at least one meter unit for obtaining an estimate of the error vector magnitude for the carrier signal, and at least one crest factor reduction unit for dynamically reducing, based on the estimate of the error vector magnitude, the crest factor of the carrier signal.

The optimization system, in one aspect, may comprise at least one peak detector for detecting a peak in the carrier signal.

In another aspect, the at least one crest factor reduction unit may be constituted to add an inverse peaking signal to the carrier signal to cancel a detected peak, wherein the inverse peaking signal is shaped such that noise energy of the inverse peaking signal falls into a frequency band associated with the carrier signal.

Figure 3:
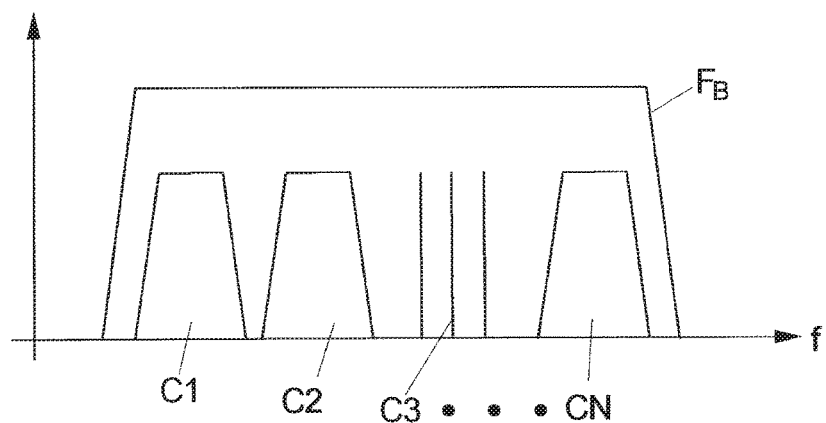
FIG. 3 shows a schematic view of a frequency band comprising a multiplicity of carrier signals associated with different telecommunication networks.

An optimization system of this kind may for example be implemented by a digital signal processor 206 shown the example of FIG. 3. The optimization system may operate in the digital regime and may act on digitized carrier signals of one or multiple communication channels.

In one aspect, the optimization system serves to dynamically reduce the crest factor of the carrier signal. This is achieved based on an estimate of the error vector magnitude obtained from a meter unit associated with the carrier signal and constituted to derive an estimate of the error vector magnitude from the carrier signal. Based on the estimate, then, the crest factor reduction may be performed for the carrier signal such that a permissible limit for the error vector magnitude is not exceeded.

By means of the meter unit an actual estimate of the error vector magnitude of the carrier signal can be derived. If it is found that the error vector magnitude lies below a permissible limit, the crest factor reduction can be performed, which reduces the peak-to-average ratio of the carrier signal, but at the same time leads to an increase of the error vector magnitude. The crest factor reduction herein may be controlled such that, in one aspect, the error vector magnitude contribution of the crest factor reduction does not cause the error vector magnitude to exceed the permissible limit.

In a further aspect, the optimization system may comprise a carrier supervision unit for monitoring the carrier signal received at the at least one input port. The carrier supervision unit may for example be constituted to determine an upper limit for the error vector magnitude. The upper limit for the error vector magnitude derived by the carrier supervision unit may be used within the crest factor reduction unit in a way such that the crest factor reduction for the carrier signal does not cause the upper limit of the error vector magnitude to be exceeded.

Generally, the crest factor describes the relation of the peak values of a signal to the effective value. The peak-to-average ratio (also denoted as the peak-to-average power ratio) equals the square of the crest factor and hence expresses the relation of the peak power to the average power of a signal.

The carrier supervision unit, in one aspect, may generally be constituted to derive characteristic values of a carrier signal associated with a communication channel of a telecommunication network. For example, the carrier supervision unit may be constituted to derive an actual power value, a nominal power value, a bandwidth, a carrier frequency, a peak-to-average ratio, an error vector magnitude value or the like from the carrier signal. For this, the carrier supervision unit may be constituted to analyse the carrier signal in the time domain, to analyse a spectrum of the carrier signal, or to derive parameters relating to the carrier signal from a broadcast channel of a telecommunication network.

In one embodiment, the optimization system may comprise an input stage, a first stage and a second stage. The input stage, in one embodiment, comprises a multiplicity of input ports for receiving a multiplicity of carrier signals associated with a multiplicity of communication channels of one or telecommunication networks of one or multiple different operators. The first stage comprises a multiplicity of meter units for obtaining an estimate of the error vector magnitude for each carrier signal, and a multiplicity of first stage crest factor reduction units for dynamically reducing, based on the estimate of the error vector magnitude, the crest factor of each carrier signal. The optimization system hence operates on multiple carrier signals in parallel. By means of the meter units, for each carrier signal an estimate of the (actual) error vector magnitude is derived. This estimate is used in a first stage crest factor reduction unit to dynamically reduce the crest factor of the carrier signal it is associated with.

The crest factor reduction is performed such that, in one aspect, an upper limit of the error vector magnitude is not exceeded by the crest factor reduction.

The input stage may, in one embodiment, comprise a multiplicity of variable gain units constituted to adjust the gain of the multiplicity of carrier signals. By means of the gain units each carrier signal is amplified to a wanted level such that a target output power per communication channel is achieved.

The input stage may, in one aspect, further comprise a multiplicity of variable delay units for introducing a variable time delay into the carrier signals in order to adjust the alignment of the carrier signals with respect to each other. The multiplicity of variable delay units may be controlled by an alignment optimizer constituted to align the carrier signals such that a peak formation in a combined signal produced by combining the carrier signals is reduced.

In a particular example, the input stage may comprise an input stage combiner to produce, from the multiple carrier signals, an input stage combined signal, and a peak detector may be present for detecting a peak in the input stage combined signal. The alignment optimizer may then, in one embodiment, analyse the input stage combined signal and may in particular determine whether a peak of the input stage combined signal is correlated with a peak of a carrier signal. If this is the case, the alignment optimizer may for example introduce a delay into the carrier signal such that the alignment of the particular carrier signal with respect to the other carrier signals is adjusted.

In one embodiment, the first stage comprises a first stage combiner to produce, from the multiple carrier signals, a first stage combined signal, and a peak detector for detecting a peak in the first stage combined signal. The peak detector herein is constituted to feed information, in particular amplitude and phase information, relating to a detected peak to the multiple first stage crest factor reduction units, which each may use this information in order to produce an inverse peaking signal for an associated carrier signal and add the inverse peaking signal to the carrier signal. The inverse peaking signal may be weighted by a gain value signalled from a first stage controller controlling the crest factor reduction units.

The second stage of the optimization system may, in one embodiment, include a combiner for combining output signals of the multiplicity of first stage crest factor reduction units to obtain a second stage combined signal. A second stage crest factor reduction unit may then operate on the second stage combined signal in order to perform the crest factor reduction on the second stage combined signal.

The first stage crest factor reduction units operate on the individual carrier signals and reduce the crest factor of the individual carrier signals. This may for example be achieved by adding an inverse peaking signal to a particular carrier signal such that a peak in the first stage combined signal (produced from the individual carrier signals) is cancelled. The inverse peaking signal, in one aspect, is shaped such that noise energy is added to the carrier signal, but is confined to the frequency band of the carrier signal such that the noise affects only the carrier signal in question, but not the other carrier signals. The crest factor reduction is performed dynamically by taking the actual error vector magnitude estimate derived by the meter unit associated with the carrier signal into account such that the crest factor reduction of the carrier signal does not cause the error vector magnitude to exceed the permissible upper limit of the error vector magnitude for that carrier signal.

The second stage crest factor reduction, in contrast, is performed on the overall, combined signal. The second stage crest factor reduction again may be performed by adding an inverse peaking signal to the carrier signal to cancel a detected peak within the combined signal. Herein, however, the inverse peaking signal is shaped such that noise energy is added to the entire frequency band of all carrier signals, such that the noise of the crest factor reduction is distributed over all carrier signals.

The second stage crest factor reduction may also increase the error vector magnitude of the individual carrier signals. Hence, the second stage crest factor reduction is performed by taking into account the actual error vector magnitude of the individual carrier signals of the first stage crest factor reduction. In particular, the second stage crest factor reduction is performed such that the permissible limits of the individual carrier signals are not exceeded by the contribution of the second stage crest factor reduction.

In one embodiment, the second stage comprises a multiplicity of filter units for filtering the output signals of the multiplicity of first stage crest factor reduction units prior to combining the output signals in the second stage combiner. In one embodiment, the figures may for example be constituted to attenuate one, some or all of the output signals to limit the contribution to the second stage combined signal. This may be used to reduce the peak formation in the second stage combined signal, wherein this approach may for example be used if the output signals associated with the different carrier signals are already at their error vector magnitude limits such that no further error vector magnitude contribution can be added to the carrier signals.

The attenuation introduced by the filter units may be used in addition or alternatively to the crest factor reduction by means of the second stage crest factor reduction unit. The second stage crest factor reduction acting onto the overall combined signal may in particular be used to reduce the peak-to-average ratio of the combined signal if the vector magnitudes of the carrier signals are not at their prescribed limits such that the error vector magnitude contribution per carrier is permissible.

The second stage may comprise meter units for obtaining estimates of the actual error vector magnitude of the output signals output from the first stage crest factor reduction units.

Furthermore, the second stage may comprise a meter unit for obtaining an estimate of the error vector magnitude of the second stage combined signal.

In one aspect, a second stage controller may be used to control the second stage crest factor reduction unit and/or the second stage filter units. The estimates of the error vector magnitude of the output signals of the first stage crest factor reduction units as well as the estimate of the error vector magnitude of the second stage combined signal may be fed to the second stage controller for controlling the second stage crest factor reduction unit and the second stage filter units.

FIG. 3 shows an example of a frequency band $F_B$ which contains multiple subbands associated with carrier signals C1-CN of different communication channels. The subbands may belong to different radio access technologies of different telecommunication networks adhering to different standards, such as GSM, UMTS, LTE or the like.

The repeater system 1 as it is schematically illustrated in FIGS. 1 and 2 may be constituted to process the overall frequency band $F_B$ including the multiple carrier signals C1-CN in order to provide network coverage in a coverage area, such as on different floors 40 of a building 4.

Figure 4:
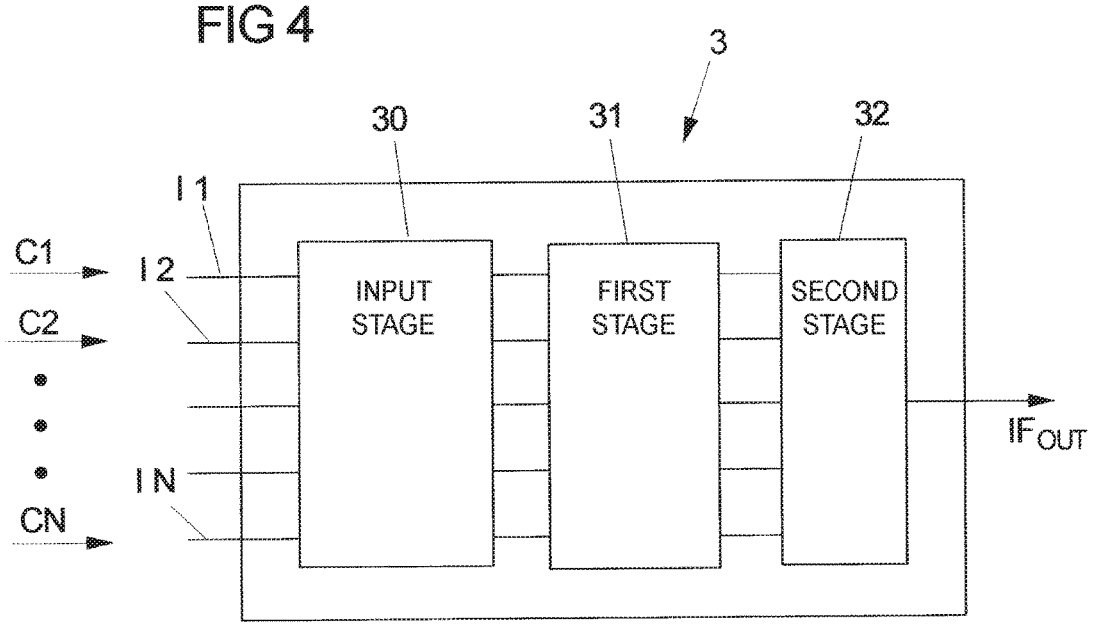
FIG. 4 shows a schematic view of an optimization system for optimizing a power efficiency of a power amplifier.

A schematic drawing of an optimization system 3 is shown in FIG. 4. A more detailed example is illustrated by the sequence of FIG. 5A to 5C.

The optimization system 3 receives, as input, multiple carrier signals C1-CN at multiple input ports I1-IN. The carrier signals C1-CN may be digitized and may have been downconverted to an intermediate frequency band and may be processed at the intermediate frequency by means of the optimization system 3.

The carrier signals C1-CN are fed to an input stage 30 of the optimization system 3, are then passed to a first stage 31 before entering a second stage 32 of the optimization system 3. The second stage 32 outputs an output signal $IF_{OUT}$ produced by combining the (processed) individual carrier signals C1-CN in the second stage 302.

Figure 5A:
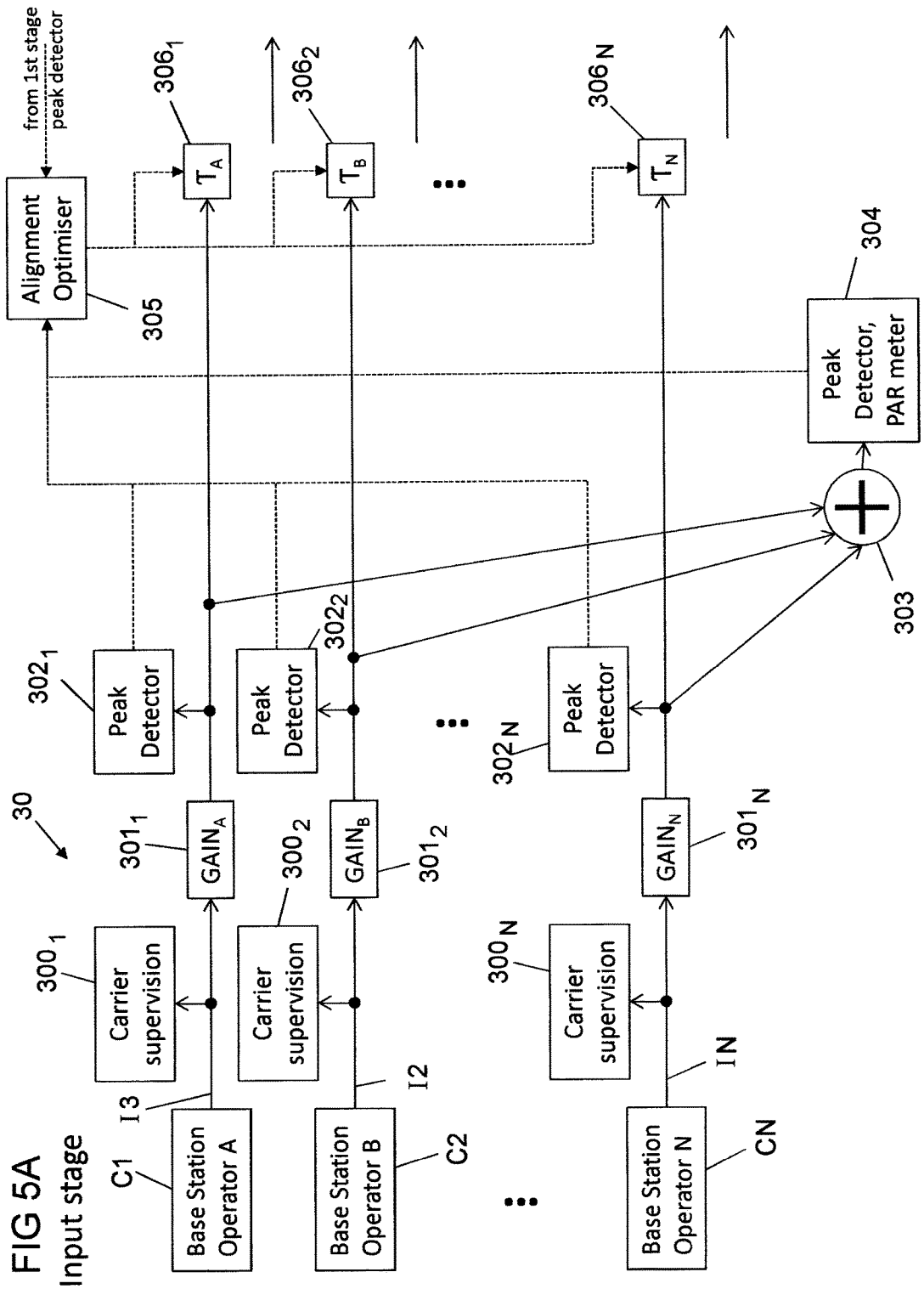
FIG. 5A shows a schematic view of an input stage of an optimization system.
Figure 5B:
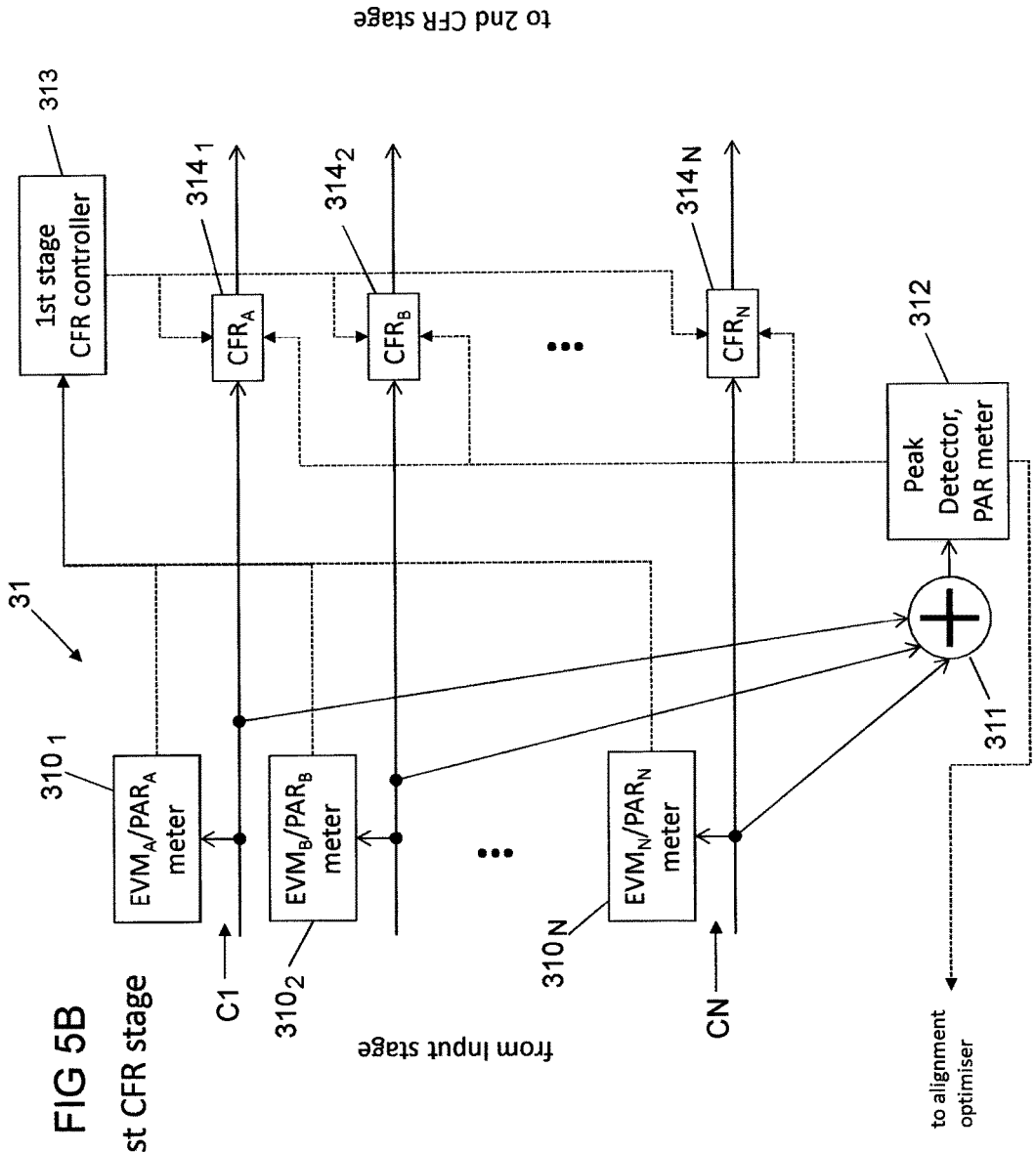
FIG. 5B shows a schematic view of a first stage of the optimization system subsequent to the input stage.
Figure 5C:
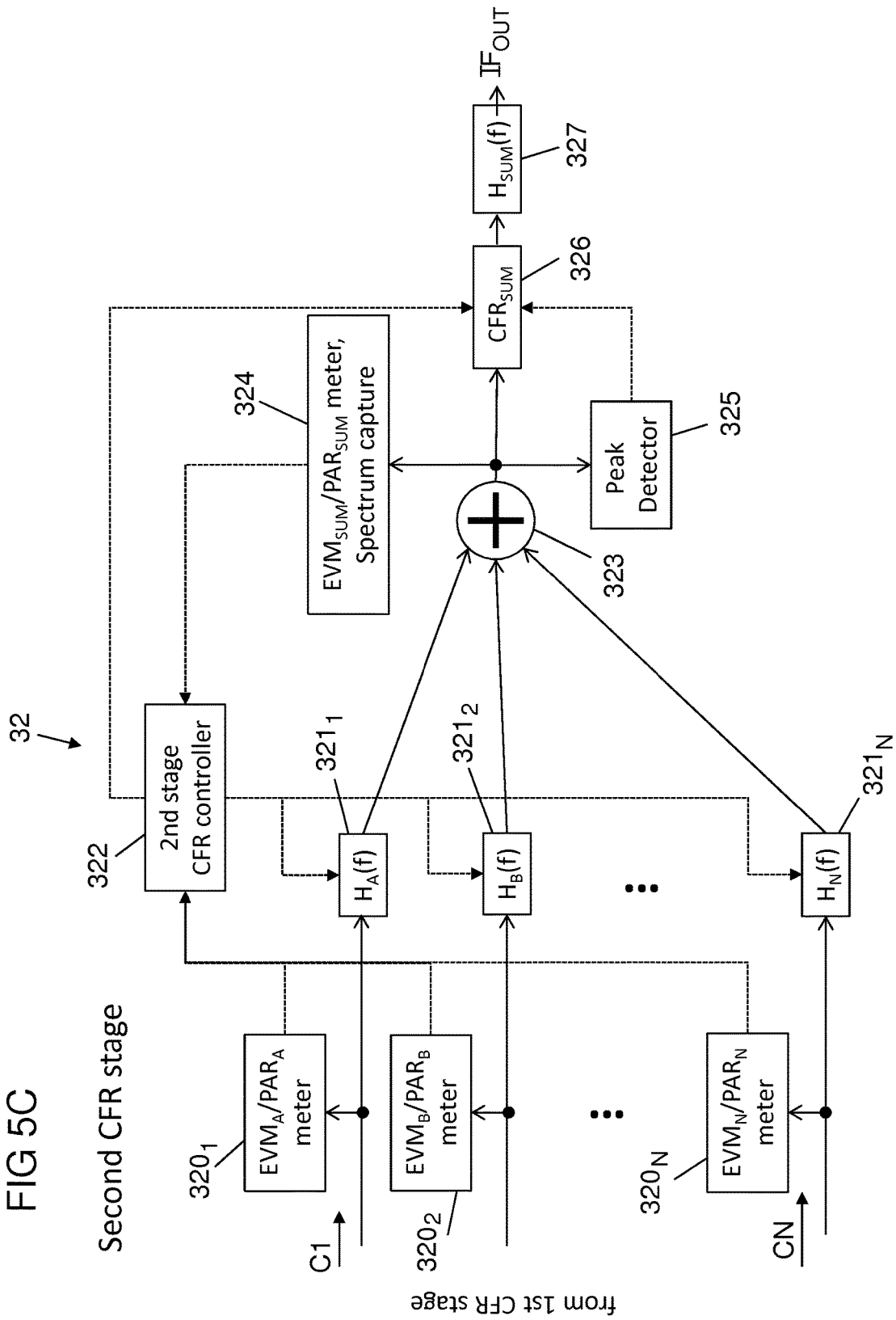
FIG. 5C shows a schematic view of a second stage of the optimization system.

The different stages 30-32 are illustrated in more detail in FIG. 5A to 5C.

In the input stage 30, shown in FIG. 5A, carrier signals C1-CN are fed to input ports I1-IN. The input stage 30 comprises a multiplicity of carrier supervision units $300_1$-$300_N$ which serve to monitor the carrier signals C1-CN. The carrier supervision units $300_1$-$300_N$ may in particular derive parameters associated with the carrier signals C1-CN, such as an actual and nominal power, a bandwidth, a carrier frequency, a peak-to-average ratio, and EVM value or the like. For this, the carrier supervision units $300_1$-$300_N$ may for example analyse the carrier signals C1-CN in the time domain, or may perform a spectral analysis of the carrier signals C1-CN. In addition or alternatively, the carrier supervision units $300_1$-$300_N$ may receive and read out broadcast channel parameters broadcast by base stations associated with the carrier signals C1-CN in order to derive parameters from the broadcast signals.

The supervision process may be slow in comparison with the actual crest factor optimization performed by the optimization system 3. The carrier supervision units $300_1$-$300_N$ may for example calculate, for each carrier signal C1-CN, a permissible upper limit for the error vector magnitude at the power amplifier input.

The carrier signals C1-CN are entered into gain units $301_1$-$301_N$ in which the gain of the carrier signals C1-CN is individually set such that a desired target output power per carrier signal C1-CN is achieved. For this, readings of the carrier supervision units $300_1$-$300_N$ may be used.

In each path associated with a carrier signal C1-CN, further, a peak detector $302_1$-$302_N$ is present, which serves to detect whether a peak occurs within the carrier signal C1-CN it is associated with. The peak detectors $302_1$-$302_N$ send their findings to an alignment optimizer 305 serving to optimize the alignment of the carrier signals C1-CN with respect to each other.

For this, the alignment optimizer 305 analyses whether a peak of a carrier signal C1-CN is correlated with a peak of a combined signal obtained by combining the carrier signals C1-CN by means of a combiner 303. A peak detector 304 detects a peak within the combined signal and sends corresponding information to the alignment optimizer 305. If the alignment optimizer 305 finds that a peak of the carrier signal C1-CN is correlated with a peak of the combined signal, the alignment of the carrier signal C1-CN with respect to the other carrier signals C1-CN is adjusted by controlling an associated variable delay unit $306_1$-$306_N$ introducing a time delay in the particular carrier signal C1-Cn. By optimizing the delays of the carrier signals C1-CN with respect to each other, hence, the alignment of the carrier signals C1-CN may be adjusted such that a peak formation within the combined signal is minimized.

From the variable delay units $306_1$-$306_N$ the carrier signals C1-CN are fed to the first stage 31, as illustrated in FIG. 5B (the input stage 30 may logically form part of the first stage 31 and serves to process the carrier signals C1-CN prior to performing a crest factor reduction on the carrier signals C1-CN in the first stage).

As shown in FIG. 5B, in the first stage 31 the actual error vector magnitude (EVM) is estimated for each carrier signal C1-CN by means of meter units $310_1$-$310_N$. The error vector magnitude may for example be estimated based on measurements of known signals (for example broadcast signals or cell specific reference signals in case of LTE) and/or based on the measured current peak-to-average ratio per carrier C1-CN. The meter units $310_1$-$310_N$ feed the actual error vector magnitude estimates to the first stage controller 313.

Furthermore, the carrier signals C1-CN are combined by means of a combiner 311, and a peak detector 312 detects the presence of a peak in the combined signal. Information from the peak detector 312 is fed back to the alignment optimizer 305, which hence may iteratively optimize the alignment of the carrier signals C1-CN with respect to each other.

The first stage controller 313 serves to control crest factor reduction units $314_1$-$314_N$ acting onto the individual carrier signals C1-CN. The crest factor reduction units $314_1$-$314_N$ herein are controlled by the first stage controller 313 such that a permissible upper limit of the individual carrier signals C1-CN, obtained for example from the carrier supervision units $300_1$-$300_N$, is not exceeded. In particular, the crest factor reduction is performed by means of the crest factor reduction units $314_1$-$314_N$ only in such a way that a vector magnitude contribution introduced by the crest factor reduction does not cause the permissible upper error vector magnitude limit to be exceeded for a carrier signal C1-CN.

The crest factor reduction units $314_1$-$314_N$ take the information from the peak detector 312 into account. Namely, the crest factor reduction units $314_1$-$314_N$ add inverse peaking signals to the individual carrier signals C1-CN such that a peak in the combined signal is cancelled. Herein, the inverse peaking signals supplied by the crest factor reduction units $314_1$-$314_N$ are shaped in a way that the noise energy of the inverse peaking signals falls into that part of the spectrum associated with the respective carrier signal C1-CN. The crest factor reduction performed by the crest factor reduction units $314_1$-$314_N$ hence adds noise to the individual channels the crest factor reduction units $314_1$-$314_N$ are associated with.

The peak detector 312 sends phase and amplitude information of a detected peak to the crest factor reduction units $314_1$-$314_N$. The amplitude information is weighted with a gain value signalled by the first stage controller 313 to determine the gain of the individual inverse peaking signals added to the carrier signals C1-CN by means of the crest factor reduction units $314_1$-$314_N$.

Following the crest factor reduction units $314_1$-$314_N$, the carrier signals C1-CN enter into the second stage 32, in which, as illustrated in FIG. 5C, the actual error vector magnitude is estimated per channel in meter units $320_1$-$320_N$. The estimates of the actual error vector magnitude per channel is fed to a second stage controller 322, which serves to control filter units $321_1$-$321_N$ and a second stage crest factor reduction unit 326.

After the error vector magnitude estimates have been taken, the carrier signals C1-CN are passed through the filter units $321_1$-$321_N$, in which the carrier signals C1-CN are filtered. The filter units $321_1$-$321_N$ may be high-order filters, or may be simple gain and/or phase shifters. The filter coefficients of the filter units $321_1$-$321_N$ are selected by the second stage controller 322 based for example on information from the carrier supervision units $300_1$-$300_N$ of the input stage 30.

After having passed the filter units $321_1$-$321_N$ the carrier signals C1-CN are combined in a combiner 323. Upon combining, a regrowth of peaks within the combined signal produced from the individual carrier signals C1-CN may occur, which may be counteracted in different ways.

In a first option, the carrier signals C1-CN may be attenuated by means of the filter units $321_1$-$321_N$ such that the contributions from the individual carrier signals C1-CN to the combined signal is limited. If in particular such carrier signals C1-CN are attenuated which predominantly contribute to the regrowth of a peak, the peak height may be reduced. The attenuation of one or multiple carrier signals C1-CN herein does not lead to an increase in the error vector magnitude, such that this approach may be preferred if the carrier signals C1-CN are already at or close to their permissible upper limit of the error vector magnitude.

In a second option, a peak in the combined signal output from the combiner 323 may be reduced by the second stage crest factor reduction unit 326, which is controlled by the second stage controller 322. The second stage controller 322 may take into account an error vector magnitude estimate obtained for the combined signal by means of a meter unit 324. Furthermore, a peak detector 325 feeds phase and amplitude information of a peak to the second stage crest factor reduction unit 326, which produces an inverse peaking signal and adds the inverse peaking signal to the combined signal in order to cancel a peak in the combined signal.

The inverse peaking signal is shaped such that noise is distributed over all carriers within the frequency band. In particular, the inverse peaking signal may be shaped such that a constant error vector magnitude is added to all carrier signals C1-CN.

In order to reduce the complexity of the second stage crest factor reduction unit 326 the de-rating of the Adjacent Channel Leakage Power Ratio (ACLR) may be permissible.

Even a clipping of peaks may be permissible in the second stage crest factor reduction unit 326.

In a final filter unit 327 the noise contribution of the second stage crest factor reduction unit 326 to unused spectrum parts may be reduced.

The carrier signals C1-CN processed in this way may then be output as a combined signal $IF_{OUT}$ for power amplification, wherein the peak-to-average ratio of the output signal $IF_{OUT}$ is optimized and hence an efficient power amplification of the signal is possible.

The invention is not limited to the embodiments described above, but may be implemented in entirely different examples in an entirely different way. The embodiments are not meant to limit the scope of the invention, but merely serve for illustrative purposes.

LIST OF REFERENCE NUMERALS

1 System
10 Host unit
100 Antenna
11 Remote unit
110 Antenna
12 Transport medium
20 Receiving section
21 Transmitting section
201 RF filter
202 Low-noise amplifier
203 Downconverter
204 Analog-to-digital converter
205, 206 Digital signal processor (DSP)
207 Digital-to-analog converter
208 Upconverter
209 Power amplifier
210 RF filter
3 Optimization system
30 Input stage
$300_1$-$300_N$ Carrier supervision block
$301_1$-$301_N$ Gain block
$303_1$-$302_N$ Peak detector
303 Summing unit
304 Peak detector
305 Alignment optimiser
$306_1$-$306_N$ Time shifter
31 First crest factor reduction (CFR) stage
$310_1$-$310_N$ EVM/PAR meter
311 Summing unit
312 Peak detector
313 First stage CFR controller
$314_1$-$314_N$ CFR unit
32 Second crest factor reduction (CFR) stage
$320_1$-$320_N$ EVM/PAR meter
$321_1$-$321_N$ Filter unit
322 Second stage CFR controller
323 Summing unit
324 EVM/PAR meter
325 Peak detector
326 CFR unit
327 Filter unit
4 Building
40 Floor
$C_1$-$C_N$ Carrier signal
D Downlink direction
f Frequency
$F_B$ Frequency band
$I_1$-$I_N$ Input port
$IF_{IN}$ IF input signal
$IF_{OUT}$ IF output signal
$RF_{IN}$ RF input signal
$RF_{OUT}$ RF output signal
U Uplink direction

The invention claimed is:

1. An optimization system for use in a digital repeater system, comprising:
at least one input port for receiving a carrier signal associated with a communication channel of a telecommunication network,
at least one meter unit for obtaining an estimate of an error vector magnitude for the carrier signal, and
at least one crest factor reduction unit for dynamically reducing, based on the estimate of the error vector magnitude, the crest factor of the carrier signal,
wherein the at least one crest factor reduction unit is constituted to add an inverse peaking signal to the carrier signal to cancel a detected peak, wherein the inverse peaking signal is shaped such that a noise energy of the inverse peaking signal falls into a frequency band associated with the carrier signal.

2. The optimization system of claim 1, further comprising: at least one peak detector for detecting a peak in the carrier signal.

3. The optimization system of claim 1, further comprising: a carrier supervision unit for monitoring the carrier signal received at the at least one input port, wherein the carrier supervision unit is constituted to determine an upper limit for the error vector magnitude, and the at least one crest factor reduction unit is constituted to reduce the crest factor of the carrier signal such that the upper limit is not exceeded.

4. The optimization system of claim 3, wherein the carrier supervision unit is constituted to derive at least one of an actual power value, a nominal power value, a bandwidth, a carrier frequency, a peak-to-average ratio, or an error vector magnitude value from the carrier signal.

5. The optimization system of claim 3, wherein the carrier supervision unit is constituted to analyse the carrier signal in a time domain, to analyse a spectrum of the carrier signal, or to derive parameters from a broadcast channel of the telecommunication network.

6. An optimization system for use in a digital repeater system, comprising
an input stage including a multiplicity of input ports for receiving a multiplicity of carrier signals associated with a multiplicity of communication channels of one or multiple telecommunication networks, wherein the input stage includes,
a multiplicity of variable delay units for introducing a delay into one or multiple of the carrier signals in order to adjust an alignment of the carrier signals with respect to each other,
an alignment optimizer for controlling the multiplicity of variable delay units;
and
a first stage including a multiplicity of meter units for obtaining an estimate of an error vector magnitude for each carrier signal, and a multiplicity of first stage crest factor reduction units for dynamically reducing, based on the estimate of the error vector magnitude, a crest factor of each carrier signal.

7. The optimization system of claim 6, wherein the input stage comprises a multiplicity variable gain units constituted to adjust a gain setting of the multiplicity of carrier signals.

8. An optimization system comprising:
an input stage including a multiplicity of input ports for receiving a multiplicity of carrier signals associated with a multiplicity of communication channels of one or multiple telecommunication networks, the input stage including
an input stage combiner to produce, from the multiple carrier signals, an input stage combined signal, and
a peak detector for detecting a peak in the input stage combined signal,
wherein an alignment optimizer is constituted to analyse whether a peak detected in a particular carrier signal is correlated with a peak detected in the input stage combined signal, and to control a variable delay unit associated with the particular carrier signal to introduce a delay into the particular carrier signal dependent on whether the peak detected in the particular carrier signal is correlated with the peak detected in the input stage combined signal; and
a first stage including a multiplicity of meter units for obtaining an estimate of an error vector magnitude for each carrier signal, and a multiplicity of first stage crest factor reduction units for dynamically reducing, based on the estimate of the error vector magnitude, a crest factor of each carrier signal.

9. An optimization system comprising:
an input stage including a multiplicity of input ports for receiving a multiplicity of carrier signals associated with a multiplicity of communication channels of one or multiple telecommunication networks;
a first stage including a multiplicity of meter units for obtaining an estimate of an error vector magnitude for each carrier signal, and a multiplicity of first stage crest factor reduction units for dynamically reducing, based on the estimate of the error vector magnitude, a crest factor of each carrier signal, the first stage including,
a first stage combiner to produce, from the multiple carrier signals, a first stage combined signal, and
a peak detector for detecting a peak in the first stage combined signal, wherein the peak detector is constituted to feed information relating to a detected peak to the multiple first stage crest factor reduction units.

10. An optimization system comprising:
an input stage including a multiplicity of input ports for receiving a multiplicity of carrier signals associated with a multiplicity of communication channels of one or multiple telecommunication networks;
a first stage including a multiplicity of meter units for obtaining an estimate of an error vector magnitude for each carrier signal, and a multiplicity of first stage crest factor reduction units for dynamically reducing, based on the estimate of the error vector magnitude, a crest factor of each carrier signal;
a second stage including,
a second stage combiner for combining output signals of the multiplicity of first stage crest factor reduction units to obtain a second stage combined signal,
a second stage crest factor reduction unit for dynamically reducing a crest factor of the combined signal.

11. The optimization system of claim 10, wherein the second stage comprises a peak detector for detecting a peak in the second stage combined signal.

12. The optimization system of claim 10, wherein the second stage crest factor reduction unit is constituted to add an inverse peaking signal to the carrier signal to cancel a detected peak, wherein the inverse peaking signal is shaped such that noise energy of the inverse peaking signal falls into a frequency band associated with the second stage combined signal.

13. The optimization system of claim 10, wherein the second stage comprises a multiplicity of filter units for filtering output signals of the multiplicity of first stage crest factor reduction units prior to combining the output signals in the second stage combiner.

14. The optimization system of claim 13, wherein the multiplicity of filter units are constituted to attenuate one or multiple of the output signals to limit the contribution of the one or the multiple output signals to the second stage combined signal.

15. The optimization system of claim 10, wherein the second stage comprises a meter unit to derive an estimate of the error vector magnitude of the second stage combined signal, wherein the estimate is fed to a second stage controller for controlling the second stage crest factor reduction unit.

16. A method for optimizing the operation of a digital repeater system, comprising:
receiving a carrier signal associated with a communication channel of a telecommunication network,
obtaining an estimate of a error vector magnitude for the carrier signal, and
dynamically reducing, based on the estimate of the error vector magnitude, a crest factor of the carrier signal by adding an inverse peaking signal to the carrier signal to cancel a detected peak, wherein the inverse peaking signal is shaped such that a noise energy of the inverse peaking signal falls into a frequency band associated with the carrier signal.

* * * * *